(12) United States Patent
Sall et al.

(10) Patent No.: US 7,346,516 B2
(45) Date of Patent: Mar. 18, 2008

(54) METHOD OF SEGMENTING AN AUDIO STREAM

(75) Inventors: Mikhael A. Sall, St. Petersburg (RU); Sergei N. Gramnitskiy, St. Petersburg (RU); Alexandr L. Maiboroda, St. Petersburg (RU); Victor V. Redkov, St. Petersburg (RU); Anatoli I. Tikhotsky, St. Petersburg (RU); Andrei B. Viktorov, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 803 days.

(21) Appl. No.: 10/370,065

(22) Filed: Feb. 21, 2003

(65) Prior Publication Data

US 2003/0171936 A1    Sep. 11, 2003

(30) Foreign Application Priority Data

Feb. 21, 2002    (KR) .................... 10-2002-0009209

(51) Int. Cl.
*G10L 19/00*    (2006.01)
(52) U.S. Cl. .................. 704/500; 704/219; 704/205
(58) Field of Classification Search ............... 704/231, 704/273, 200, 246, 251, 272, 235, 260, 230, 704/222, 219, 206, 205, 207, 209, 216, 217, 704/218, 500, 501
See application file for complete search history.

(56) References Cited

U.S. PATENT DOCUMENTS

| | | |
|---|---|---|
| 4,393,272 A | 7/1983 | Itakura et al. ............ 179/1 SA |
| 5,606,643 A | 2/1997 | Balasubramanian et al. ............ 395/2.52 |
| 6,185,527 B1 | 2/2001 | Petkovic et al. ............ 704/231 |
| 6,567,775 B1 * | 5/2003 | Maali et al. ................ 704/231 |
| 6,931,373 B1 * | 8/2005 | Bhaskar et al. ............. 704/230 |

OTHER PUBLICATIONS

Zhan et al., "Dragon Systems' 1997 Mandarin Broadcast News System," Proceedings of the Broadcast News Transcription and Understanding Workshop, Landsdowne, VA, pp. 25-27, 1998.
Wegmann, et al., "Progress in Broadcast News Transcription at Dragon System," Proceedings of ICASSP 1999, Phoenix, AZ, Mar. 1999.
Saunders, "Real-Time Discrimination of Broadcast Speech/Music," Proceedings of ICASSP 1996, pp. 993-996.

(Continued)

*Primary Examiner*—Huyen X. Vo
(74) *Attorney, Agent, or Firm*—Ked & Associates, LLP (57) ABSTRACT

Disclosed herein is a segmentation method, which divides an input audio stream into segments containing different homogeneous signals. The main objective of this method is localization of segments with stationary properties. This method seeks all no-stationary points or intervals in the audio stream and creates a list of segments. The obtained list of segments can be used as an input data for the following procedures, such as classification, speech/music/noise attribution and so on. The proposed segmentation method is based on the analysis of audio signal statistical features variation and comprises three main stages: stage of first-grade characteristics calculation, stage of second-grade characteristics calculation and stage of decision-making.

2 Claims, 7 Drawing Sheets

OTHER PUBLICATIONS

Zue and Spina, "Automatic Transcription of General Audio Data Preliminary Analyses," Proceedings of ICSP 1996, pp. 594-597.

Scheier and Slaney, "Constructions and Evaluation of a Robust Multifeature Speech/Music Discriminator," Proceedings of ICASSP 1997, pp. 1331-1334.

Carey et al., "A Comparison of Features for Speech, Music Discrimination," Proceedings of IEEE 1999, pp. 149-152.

Marple, Jr. "Digital Spectral Analysis," Prentice-Hall, Inc., Englewood Cliffs, N.J., 1987.

Campbell et al., "Voice/Unvoiced Classification of Speech with Applications of the U.S. Government LPC-10E Algorithm," Proceedings ICASSP, Apr. 1986, Tokoyo, Japan, V.1, pp. 473-476.

* cited by examiner

METHOD OF SEGMENTING AN AUDIO STREAM

BACKGROUND OF THE INVENTION

1. Field of the Invention

The present invention relates to a segmentation method of an audio data stream, which is broadcasted or recorded using some media, wherein this audio data stream is a sequence of digital samples, or may be transformed to the sequence of digital samples. The goal of such segmentation is the division of audio data stream into segments, which correspond to different physical sources of audio signal. In the case when some source(s) and some background source(s) emit audio signal, parameters of background source(s) is not changed essentially in the framework of one segment.

2. Description of the Related Art

Audio and video recordings have become commonplace with the advent of consumer grade recording equipment. Unfortunately, both the audio and video streams provide few clues to assist in accessing the desired section of the record. In books, indexing is provided by the table of contents at the front and the index at the end, which readers can browse to locate authors and references to authors. A similar indexing scheme would be useful in an audio stream, to help in location of sections where, for example, specific speakers were talking. The limited amount of data associated with most audio records does not provide enough information for confidently and easily access to desired points of interest. So, user has to peruse the contents of a record in sequential order to retrieve desired information.

As a solution of this problem, it is possible to use the automatic indexing system of audio events in the audio data stream. The indexation process consists of two sequential parts: segmentation and classification processes. Segmentation process implies division of the audio stream into homogeneous (in some sense) segments. Classification process implies the attributing of these segments by appropriate notes. Thus, segmentation process is the first and very important stage in the indexation process. To this problem, the basic notice in the given invention is given.

As the basic audio events in the audio stream, it is accepted to consider speech, music and noise (that is non-speech and non-music). The basic notice in a world is given to the speech detection, segmentation and indexation in audio stream, such as broadcast news.

Broadcast news data come to use in long unsegmented speech streams, which not only contain speech with various speakers, backgrounds, and channels, but also contain a lot of non-speech audio information. So it is necessary to chop the long stream into smaller segments. It is also important to make these smaller segments homogeneous (each segment contains the data from one source only), so that the non-speech information can be discarded, and those segments from the same or similar source can be clustered for speaker normalization and adaptation.

Zhan et al., "Dragon Systems' 1997 Mandarin Broadcast News System", Proceedings of the Broadcast News transcription and Understanding Workshop, Lansdowne, Va., pp. 25-27, 1998, produced the segments by looking for sufficiently long silence regions in the output of a coarse recognition pass. This method generated considerable multi-speaker segments, and no speaker change information was used in the segmentation.

In the subsequent works, Wegmann et al., "Progress in Broadcast News Transcription at Dragon System", Proceedings of ICASSP'99, Phoenix, Ariz., March, 1999, used the speaker change detection in the segmentation pass. The following is a procedure of their automatic segmentation:

An amplitude-based detector was used to break the input into chunks that are 20 to 30 seconds long.

These chunks were chopped into 2 to 30 seconds long, based on silences produced from a fast word recognizer.

These segments were further refined using a speaker change detector.

Balasubramanian et al., U.S. Pat. No. 5,606,643, enables retrieval based on indexing an audio stream of a recording according to the speaker. In particular, the audio stream may be segmented into speaker events, and each segment labeled with the type of event, or speaker identity. When speech from individuals is intermixed, for example in conversational situations, the audio stream may be segregated into events according to speaker difference, with segments created by the same speaker identified or marked.

Creating an index in an audio stream, either in real time or in post-processing, may enable a user to locate particular segments of the audio data. For example, this may enable a user to browse a recording to select audio segments corresponding to a specific speaker, or "fast-forward" through a recording to the next speaker. In addition, knowing the ordering of speakers can also provide content clues about the conversation, or about the context of the conversation.

The ultimate goal of the segmentation is to produce a sequence of discrete segments with particular characteristics remaining constant within each one. The characteristics of choice depend on the overall structure of the indexation system.

Saunders, "Real-Time Discrimination of Broadcast Speech/Music", Proc. ICASSP 1996, pp. 993-996, has described a speech/music discriminator based on zero-crossings. Its application is for discrimination between advertisements and programs in radio broadcasts. Since it is intended to be incorporated in consumer radios, it is intended to be low cost and simple. It is mainly designed to detect the characteristics of speech, which are described as, limited bandwidth, alternate voiced and unvoiced sections, limited range of pitch, syllabic duration of vowels, energy variations between high and low levels. It is indirectly using the amplitude, pitch and periodicity estimate of the waveform to carry out the detection process since zero-crossings give an estimate of the dominant frequency in the waveform.

Zue and Spina, "Automatic Transcription of General Audio Data: Preliminary Analyses", Proc. ICSP 1996, pp. 594-597, use an average of the cepstral coefficients over a series of frames. This is shown to work well in distinguishing between speech and music when the speech is band-limited to 4 kHz and music to 16 kHz but less well when both signals occupied a 16 kHz bandwidth.

Scheier and Slaney, "Construction and Evaluation of a Robust Multifeature Speech/Music Discriminator", Proc. ICASSP 1997, pp. 1331-1334, use a variety of features. These are: four hertz modulation energy, low energy, roll off of the spectrum, the variance of the roll off of the spectrum, the spectral centroid, variance of the spectral centroid, the spectral flux, variance of the spectral flux, the zero-crossing rate, variance of the zero-crossing rate, the cepstral residual, variance of the cepstral residual, pulse metric. The first two features are amplitude related. The next six features are derived from the fine spectrum of the input signal and therefore are related to the techniques described in the previous reference.

Carey et al., "A Comparison of Features for Speech, Music Discrimination", Proc. IEEE 1999, pp. 149-152, use a variety of features. There are: cepstral coefficients, delta cepstral coefficients, amplitude, delta amplitude, pitch, delta pitch, zero-crossing rate, delta zero-crossing rate. The pitch and cepstral coefficients encompass the fine and broad spectral features respectively. The zero-crossing parameters and the amplitude were believed worthy of investigation as a computationally inexpensive alternative to the other features.

SUMMARY OF THE INVENTION

The present invention provides a segmentation procedure to chunk an input audio stream into segments having homogeneous acoustic characteristics. This audio stream is a sequence of digital samples, which are broadcasted or recorded using some media.

An object of the invention is to provide a fast segmentation procedure with a relatively low numerical complexity.

The segmentation procedure comprises three stages. These are: first-grade characteristic calculation, second-grade characteristic calculation, and decision-making. The stage of first-grade characteristic calculation is aimed for calculation of audio features vectors from the input audio stream. These features vectors define characteristics of audio signals. The stage of second-grade characteristic calculation forms sequence of statistic features vectors from the sequence of audio features vectors. The statistic features vectors define statistic features of the first-grade features. The stage of decision-making analyses variation of the second grade features and performs definition of the segments boundaries basing on that analysis.

Thus, an essential aim of the invention is to provide the segmentation method, firstly, that can be used for a wide variety of applications, secondary, that the segmentation procedure may be industrial-scaled manufactured, based on the development of one relatively simple integrated circuit.

Other aspects of the present invention can be seen upon review of the figure, the detailed description and the claims, which follow.

BRIEF DESCRIPTION OF THE DRAWING

The accompanying drawings, which are included to provide a further understanding of the invention and are incorporated in and constitute a part of this application, illustrate an embodiment of the invention and together with the description serve to explain the principle of the invention. In the drawings.

DETAILED DESCRIPTION OF THE INVENTION

Figure 1:
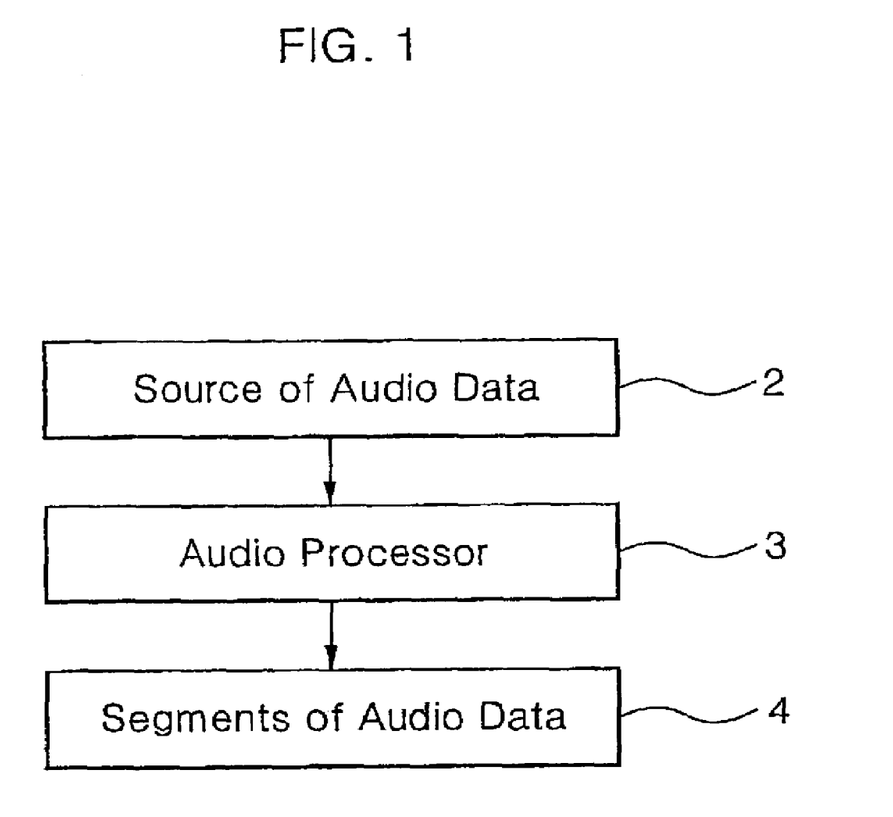
FIG. 1 is a block diagram of a generalized audio processing system within which the present invention may be embodied.

FIG. 1 is a block diagram of a generalized audio processing system 1, within which the present invention may be embodied. Generally, an audio stream is provided from a source of audio data 2, which may be provided by recorded broadcast, a recorded video with accompanying audio track, or other audio source. The audio data is sent to an audio processor 3, which may be any well-known device such as a general purpose computer, configured according to the present invention. The audio processor outputs segments of the audio data 4.

Figure 2:
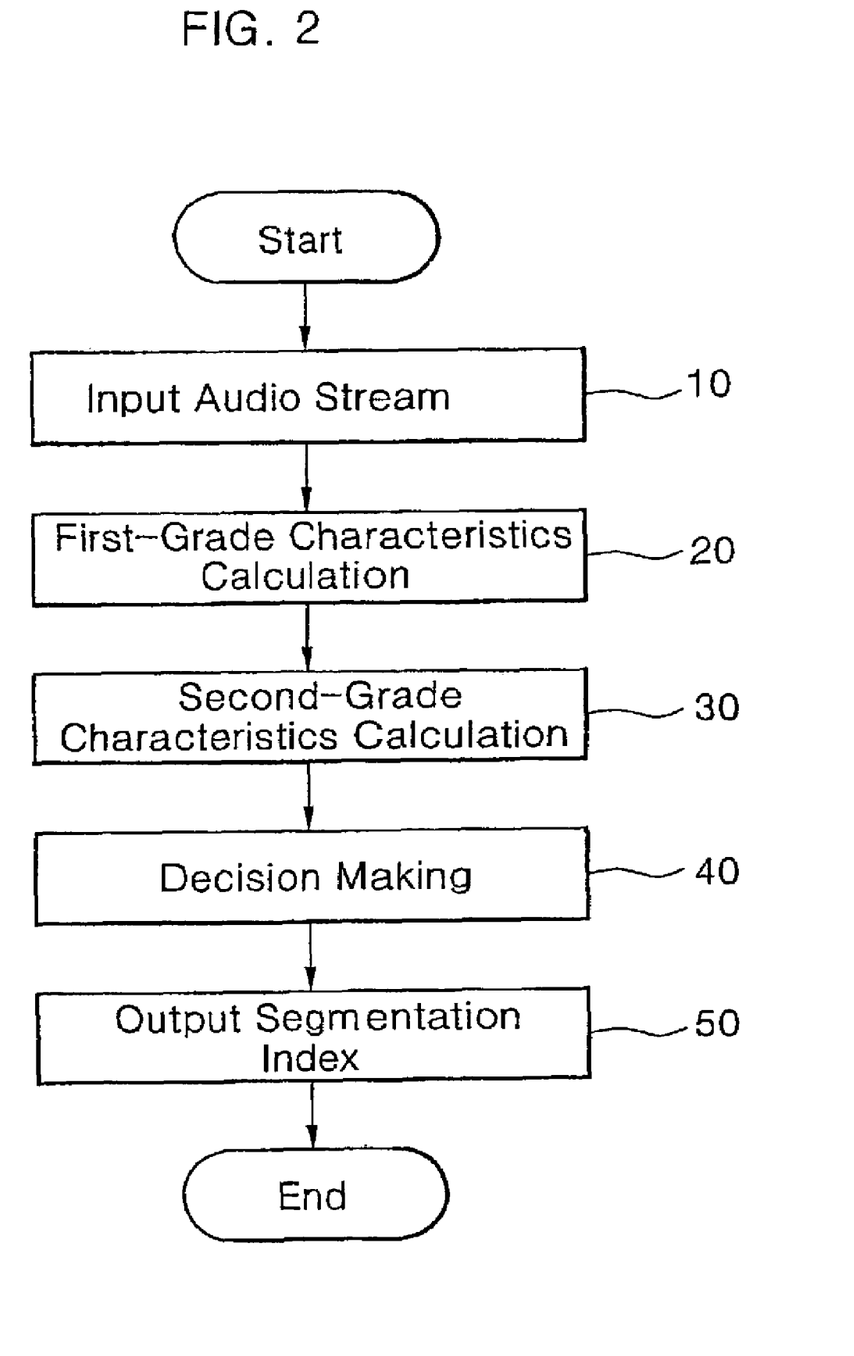
FIG. 2 is a generalized flow diagram of the audio segmentation procedure.

FIG. 2 is a generalized flow diagram of an audio segmentation procedure 5. Box 10 is the audio stream input, for example, broadcast news input. The step in box 20 is aimed for calculation of audio features vectors from the audio stream. These features vectors define characteristic features of the audio-stream. Next step 30 forms sequence of statistic features vectors from the sequence of audio features vectors. The statistic features vectors define statistic characteristic of the audio features vectors. At the step 40, variation of the statistic features vectors is analyzed and the definition of the segment boundaries basing on that analysis is performed. Thus, the proposed segmentation procedure is based on the analysis of audio signal statistical features variation. The output of the resulting index segmentation of the audio stream is performed at the step 50.

Figure 3:
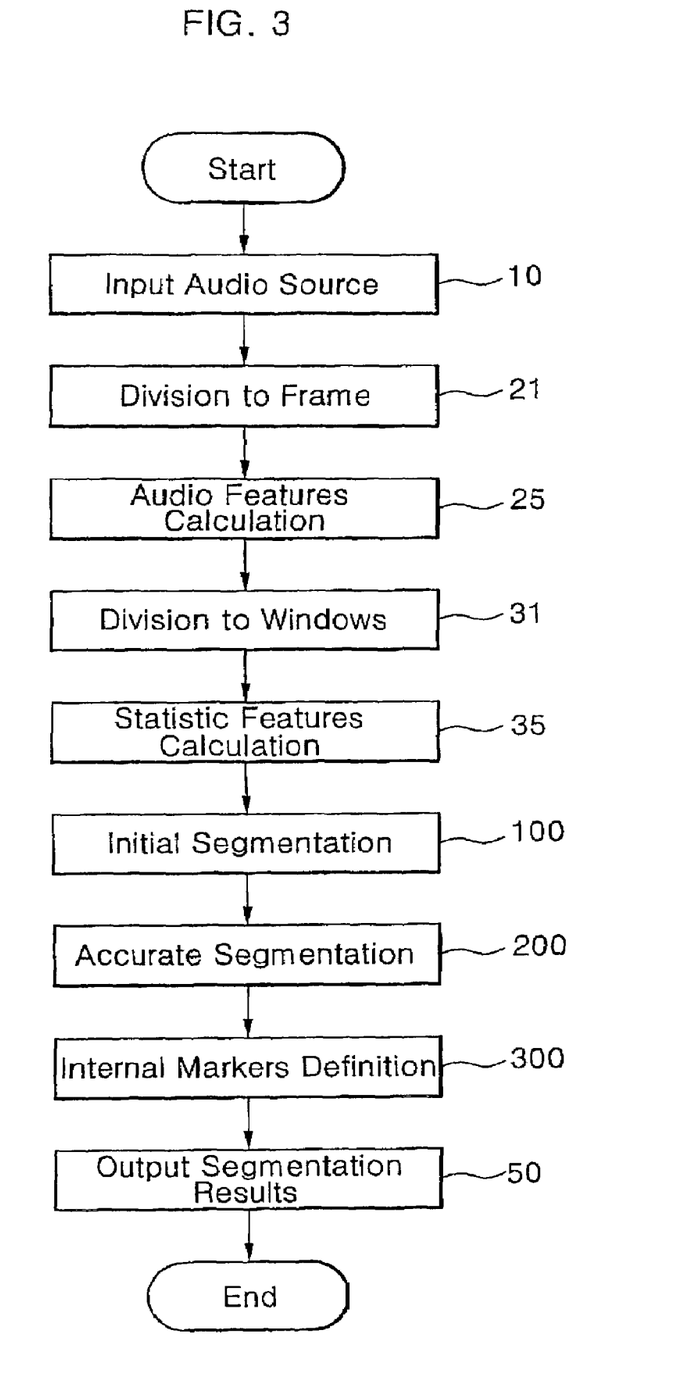
FIG. 3 is a flow diagram in detail of the audio segmentation procedure.

FIG. 3 is a flow diagram in detail of the audio segmentation procedure. After the input of audio stream data 10, an input sequence of the digital samples is divided into the sequence of short (e.g. 10-20 ms) not-overlapped frames 21. At the step 25, the feature vectors are computed for each frame. This computation is performed using 10th order Linear Predictive Coding (LPC) analysis of the samples in possibly overlapped windows, which contain said frames.

Parameters of the autoregressive linear model, which is the foundation of LPC analysis are reliable and may be defined with relatively small computation complexity. The following parameters form coordinates of audio features vector:

$\Lambda_i$, i=1 . . . 5—Formants Frequencies;
$K^1$, $K^2$—First and the Second Reflection Coefficients;
$E^0$—Energy of the Prediction Error Coefficient;
$E^1$—Preemphasized Energy Ratio Coefficient.

Parameters $K^1$, $K^2$, $E^0$ are calculated simultaneously with LPC analysis, according to Marple, Jr. "Digital Spectral Analysis", Prentice-Hall, Inc., Englewood Cliffs, N.J., 1987. After LPC analysis, 10 coefficients Line Spectral Pairs (LSP) are computed according to the patent U.S. Pat. No. 4,393,272 or ITU-T, Study Group 15 Contribution—Q. 12/15, Draft Recommendation G.729, Jun. 8, 1995, Version 5.0. $\Lambda_i$, i=1 . . . 5 Formant Frequencies are calculated as half of sum of the corresponding LSP coefficients. $E^1$ is the ratio of the energies in the 6-dB preemrhasized first-order difference audio signal to the regular audio signal, according to Campbell et al. "Voiced/Unvoiced Classification of Speech with Applications to the U.S. Government LPC-10E Algorithm", Proceedings ICASSP' 86, April, Tokyo, Japan, V.1, pp 473-476.

As the result, there are the audio feature vectors (9 characteristics at all). These vectors have definite physical meaning and the dynamical range sufficient for the precise segmentation of the audio stream. The further work of the segmentation procedure is the statistical analysis of the obtained data. The calculation of the statistical characteristics is performed in non-overlapped second-grade windows, each of these windows consists of some predefined number of frames (e.g. 20-100 frames in one window). Thus, some number of vectors of the first-grade characteristics describes such a window. The division of the input sequence of the audio feature vectors is performed at the step 31. At the step 35, the sequence of those vectors is transformed to the statistic feature vectors.

The statistical features vector $\vec{V}$ consists of two sub-vectors, the first of them consists of:

$$V_j = \frac{1}{M} \sum_{i=1_M}^{M} \Lambda_i, j = 1 \ldots 5$$

$$V_{j+5} = \frac{1}{M} \sum_{i=1}^{M} (\Lambda_i - V_j)^2, j = 1 \ldots 5$$

and the second of these sub-vectors consists of:

$$V_{11} = \left( \max_{i=1\ldots M} \{K_i^2\} - \min_{i=1\ldots M} \{K_i^2\} \right) \times \frac{1}{M} \sum_{i=1}^{M} K_i^2$$

$$V_{12} = \frac{1}{M} \sum_{i=1}^{M} E_i^0 \times \frac{1}{M} \sum_{i=1}^{M} \left( E_i^0 - \frac{1}{M} \sum_{i=1}^{M} E_i^0 \right)^2$$

$$V_{13} = \sum_{i=2}^{M} |E_i^0 - E_{i-1}^0| - \sum_{i=1}^{M} |E_i^0|$$

$$V_{14} = \max_{i=1\ldots M} \{E_i^1\} - \min_{i=1\ldots M} \{E_i^1\}$$

$$V_{15} = \sum_{i=1}^{M} B(i), \text{where} \quad B(i) = \begin{cases} 1, K_i^1 > \text{predefined thresholds} \\ 0, \text{otherwise} \end{cases},$$

where M is a number of frames in one window.

As the result, there are the statistic feature vectors (15 characteristics at all).

The sub-stages of the decision-making 40 will be discussed in more details below, but FIG. 3 serves to give an overview of the method described by the invention.

The sub-stage of initial segmentation 100 is performed in such a way that the dividing markers, which corresponds boundaries of segments, are determined with the accuracy corresponding to one second-grade window. The sub-stage of improvement of the segmentation precision 200 carried out by the previous step implies the correction of the position of each dividing marker with the accuracy corresponding to one frame and eliminating of false segments. The sub-stage of internal markers definition 300 implies the determination of a stationary interval inside each segment. The resulting sequence of the not intersected audio segments with their time boundaries is outputted at the step 50.

Sub-Stage of Initial Segmentation

Figure 4:
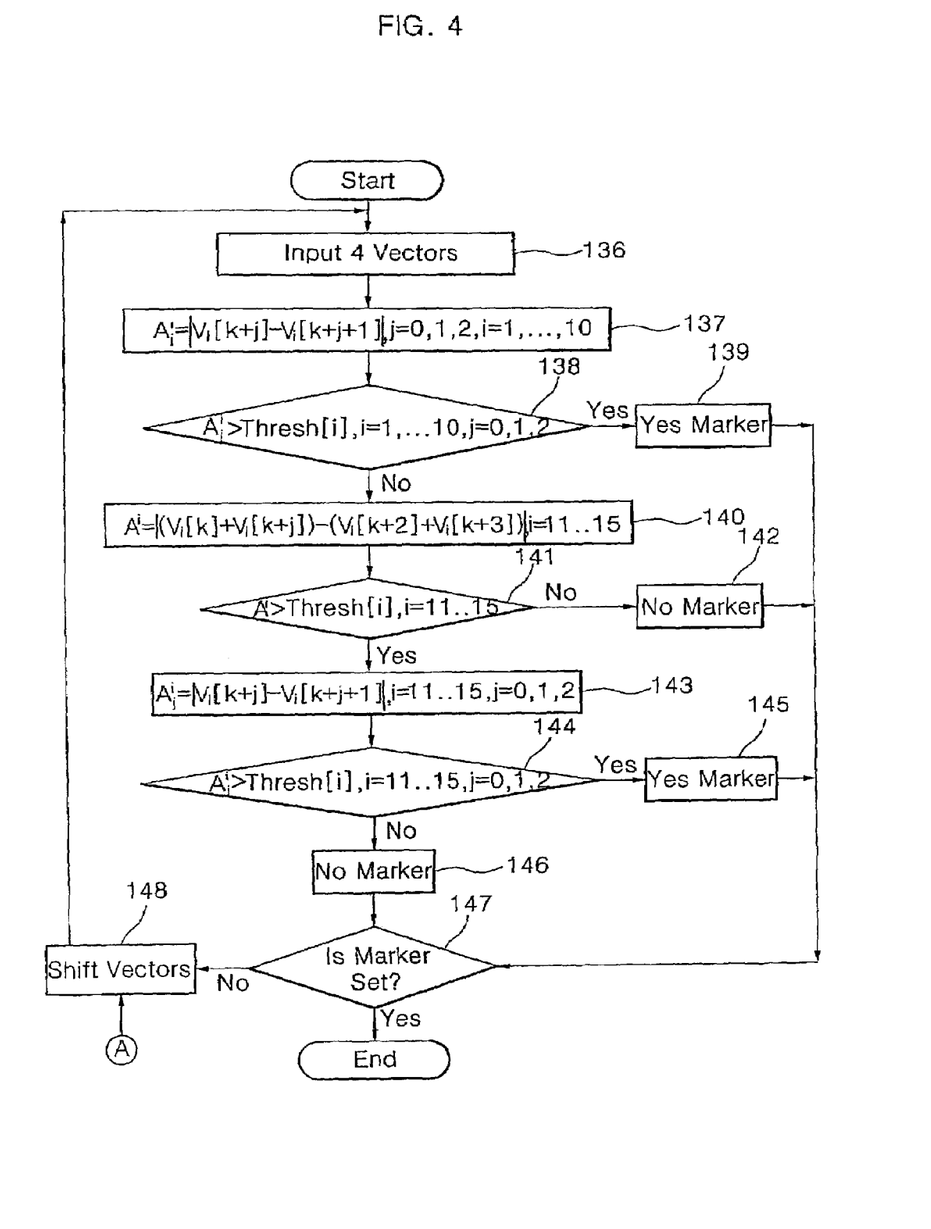
FIG. 4 illustrates a flowchart of the sub-stage of initial segmentation.

FIG. 4 illustrates a flowchart of the sub-stage of initial segmentation 100 of FIG. 3. In this sub-stage, the statistical features vectors $\vec{V}[k]$, k=1, . . . , K are analyzed. On each step, the algorithm of this sub-stage parses four sequential entry vectors. The result of the analysis is the information, where the dividing marker is placed.

Let $\vec{V}[k]$, $\vec{V}[k+1]$, $\vec{V}[k+2]$, $\vec{V}[k+3]$ four sequential statistical features vectors, which are taken 136 from the set of sequential statistical features vectors.

The differences $A_j^i = |V_i[k+j] - V_i[k+j+1]|$, j=0, 1, 2, i=1, . . . , 10 are calculated for the first sub-vectors of the statistical features vectors 137. If at least one of these values is greater than the corresponding predefined threshold 138, the dividing marker is installed between the second-range windows 139. In this case, another steps of this sub-stage does not performed and the next four vectors, first of which is the first vector after the installed dividing marker will be taken from the set of sequential statistical features vectors for analysis 148.

Otherwise the differences $A^i = |(V_i[k]+V_i[k+1])-(V_i[k+2]+V_i[k+3])|$, i=11.15 are calculated 140 for the second sub-vectors of the statistical features vectors. These values are matched with the predefined thresholds 141. The case when all of these values are smaller than the corresponding threshold values corresponds to the absence of the dividing marker 142. In this case, the last steps of this sub-stage does not performed and the next four vectors, first of which is the vector $\vec{V}[k+1]$ will be taken from the set of sequential statistical features vectors for analysis 148. Otherwise the differences $A_j^i = |V_i[k+j] - V_i[k+j+1]|$, i=11.15, j=0, 1, 2 are calculated 143 for the second sub-vectors of the statistical features vectors. If at least one of these values is greater than the corresponding predefined thresholds 144 then the dividing marker is installed between the second-range windows 145. In this case, another steps of this sub-stage is not performed and the next four vectors, first of which is the first vector after the installed dividing marker will be taken from the set of sequential statistical features vectors 148. Otherwise the next four vectors, first of which is the vector $\vec{V}[k+1]$ will be taken from the set of sequential statistical features vectors for analysis 148. If the dividing marker is taken at the step in diamond 147, then the sub-stage of initial segmentation ends and the initial segmentation marker passes to the sub-stage of accurate segmentation.

Sub-Stage of Accurate Segmentation

Figure 5:
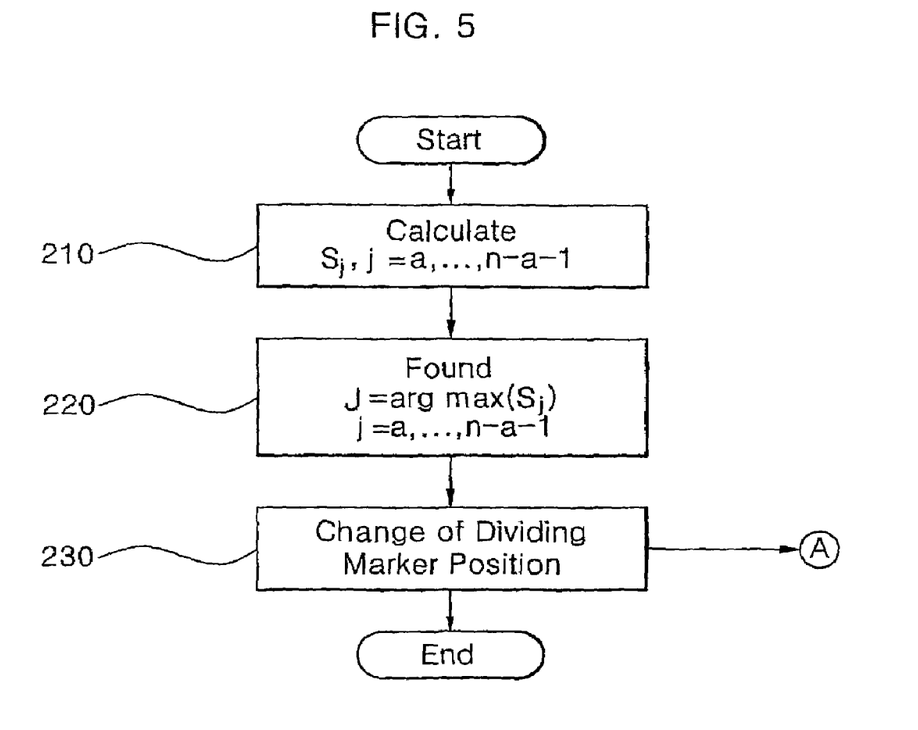
FIG. 5 illustrates a flowchart of the sub-stage of accurate segmentation.

FIG. 5 illustrates a flowchart of the sub-stage of accurate segmentation 200 of FIG. 3. The sense of this given stage operation consists in an improvement of dividing markers positions. It is achieved as a result of a precise statistical analysis of the sequence of LSP coefficients $\Lambda_i$, i=1, . . . , 5 close to each dividing marker (see FIG. 6). Let's consider an arbitrary dividing marker μ with some neighborhood, which consists of n frames, close to Formants Frequencies coefficients. At the step in box 210, the difference is evaluated:

$$S_j = \left| \frac{1}{j+1} \sum_{p=0}^{j} \sum_{i=1}^{5} \Lambda_i^{(k+p)} - \frac{1}{n-j} \sum_{p=j+1}^{n} \sum_{i=1}^{5} \Lambda_i^{(k+p)} \right|, j = a, \ldots, n-a-1, a < \frac{n}{2}$$

Argument, which correspond to maximum value $S_j$, is calculated at the step 220:

$$J = \arg\max_{j=n,\ldots,n-n-1} (S_j)$$

Figure 6:
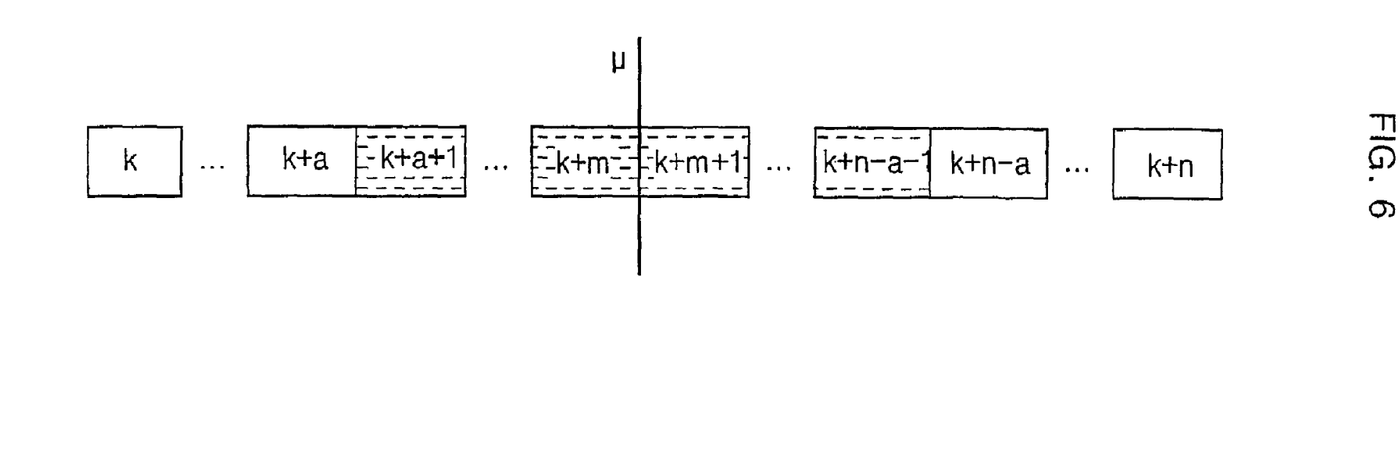
FIG. 6 shows improvement of the dividing markers positions.

At the step 230, the new dividing marker μ' is placed into the position corresponded to this J between shaded rectangles on FIG. 6. At the step in box 148 in FIG. 4, the shift of vectors is performed from the position of the new marker μ'.

Sub-Stage of Internal Markers Definition

The sub-stage of internal markers definition of the final segmentation analyses each segment with the purpose of the definition of two internal markers ($\mu^{int}$, $\eta^{int}$) defining the most homogeneous interval inside the segment. It is made with the following purposes: the placed dividing markers separate two audio events of the different nature. These events, as a rule, smoothly transiting one to another and do not have drastic border. Therefore there is a time interval containing information about both the events. That may hamper their correct classification.

As well as at the previous sub-stage, this task is solved by usage of a precise statistical analysis of a sequence of Formants Frequencies coefficients $\Lambda_i$, i=1, . . . , 5 close to each dividing marker. Let's consider an arbitrary segment, limited by markers $\mu$ and $\eta$, (so that $\eta-\mu=n+1$ frames), and composed from Formants Frequencies coefficients (see FIG. 7).

Figure 7:
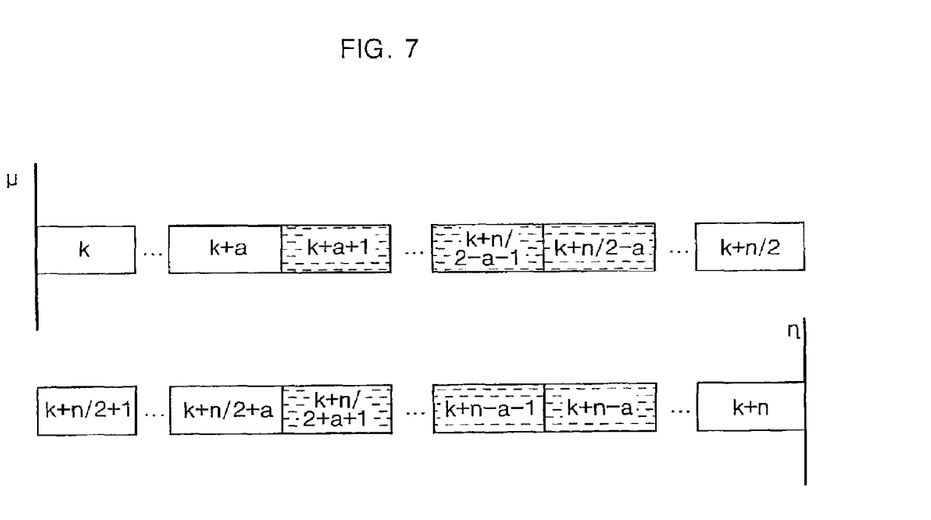
FIG. 7 shows defining the homogeneous interval inside the segment.

Firstly, two differences are evaluated:

$$S_{1j} = \frac{1}{j+1}\sum_{p=0}^{j}\sum_{i=1}^{5} \Lambda_i^{(k+p)} - \frac{1}{n/2-j}\sum_{p=j+1}^{n/2}\sum_{i=1}^{5} \Lambda_i^{(k+p)} |,$$

$$j = a, \ldots, n/2 - a - 1, \ a < \frac{n}{4}$$

$$S_{2j} = \frac{1}{j+1}\sum_{p=n/2}^{j+n/2}\sum_{i=1}^{5} \Lambda_i^{(k+p)} - \frac{1}{n/2-j}\sum_{p=j+1+n/2}^{n}\sum_{l=1}^{5} \Lambda_l^{(k+p)} |,$$

$$j = a, \ldots, n/2 - a - 1, \ a < \frac{n}{4}$$

At the second, arguments, which correspond to maximum values $S_{1j}$ and $S_{2j}$, are calculated:

$$J_1 = \underset{j=a,\ldots,n/2-a-1}{\arg\max}(S_{1j}), \ J_2 = \underset{j=a,\ldots,n/2-a-1}{\arg\max}(S_{2j}).$$

Then, the new markers $\mu^{int}$ and $\eta^{int}$ are placed into the positions corresponded to these $J_1$, $J_2$ between shaded rectangles on FIG. 7.

Thus, the process of segmentation is ended. As the result, the sequence of not intersected audio intervals with their time boundaries is obtained.

What is claimed is:

1. At method of segmentation of an audio stream, comprising;

receiving the audio stream; calculating a first-grade characteristic of the audio stream;

calculating a second-grade characteristic of the audio stream; and performing a decision-making analysis, wherein the segmentation includes a division of the audio stream into segments containing different homogeneous signals based on the first-grade characteristic and the second-grade characteristic of the audio stream;

wherein calculating of the first-grade characteristic is performed by a division of the audio stream into frames for which of them an audio feature vector is calculated;

wherein the audio feature vector includes five formant frequencies, first and second reflection coefficients, an energy of a prediction error coefficient, and a pre-emphasized energy ratio coefficient;

wherein calculating the second-grade characteristic is performed in a sequence of a predefined and not overlapped windows, each of the windows includes a definite number of said frames with said audio feature vectors calculated during the calculating of the first-grade characteristic;

wherein calculating the second-grade characteristic includes calculating a statistical feature vector for each said window;

wherein the statistical feature vector includes two sub-vectors, a first one of said two sub-vectors includes mean values of the formant frequencies and dispersions of the formant frequencies, and a second one of said two sub-vectors includes a difference between maximal and minimal values of the second reflection coefficient multiplied by the mean value of the second reflection coefficient, a product of the mean value and the dispersion of the energy of the prediction error coefficient, a sum of modules of differences between said energies of the prediction error coefficients for said neighboring frames divided by the sum of the modules of differences between said energies of the prediction error coefficients, a difference between maximal and minimal values of said pre-emphasized energy ratio coefficients, and a number of said frames in the window in which the first reflection coefficients outnumber a predefined threshold value.

2. The method according to claim 1, wherein the audio stream is a sequence of digital samples which are broadcasted or recorded using some media.

* * * * *